Patented Oct. 24, 1933

1,931,540

UNITED STATES PATENT OFFICE 1,931,540

SULPHOCARBOXYLIC ACID AMIDE

Winfrid Hentrich, Erlangen, and Helmut Keppler, Cologne-on-the-Rhine, Germany, assignors, by mesne assignments, to I. G. Farbenindustrie Aktiengesellschaft, Frankfort-on-the-Main, Germany, a corporation of Germany No Drawing. Application August 3, 1931, Serial No. 554,942, and in Germany August 5, 1930

3 Claims. (Cl. 260—124)

The present invention relates to new sulfocarboxylic acid amides being substituted in the amido group by a saturated or unsaturated higher aliphatic radical containing at least 8 carbon atoms.

The new compounds correspond to the probable general formula:

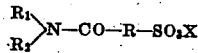

wherein R stands for a substituted or unsubstituted alkylene or aralkylene or arylene, such as ethylene, propylene,

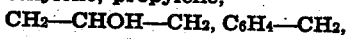

X means hydrogen, ammonium ($NH_4$) or a metallic equivalent, $R_1$ represents a saturated or unsaturated aliphatic radical containing at least 8 carbon atoms, $R_2$ means hydrogen, alkyl, for instance, a lower alkyl group or the above-mentioned saturated or unsaturated alphatic radical containing at least 8 carbon atoms aralkyl, aryl or cycloalkyl.

The manufacture of these compounds is carried out by causing a primary or secondary amine containing at least one higher unsubstituted or substituted aliphatic radical to react with a carboxylic acid containing at least one sulfonic acid group, or an appropriate functional derivative thereof, for example, ester salts.

The new compounds are colorless or weakly colored substances soluble in water or alkalies and are suitable as auxiliary products in the textile industry as softening, purifying, frothing, wetting and dispersing agents and in facilitating even dyeing. The efficacy of the same is to a large extent independent of the acid or alkaline reaction of, and of salt content in, the washing and refining baths.

Our invention is illustrated by the following example without being limited thereto. The parts are by weight.

*Example.*—12 parts of heptadecylamine are heated while stirring to 100–200 C. with 10 parts of the sodium salt of the ethyl ester of sulfoacetic acid until the mass is soluble in hot water. By crystallizing from 70 to 80% alcohol the reaction product is obtained in the form of white, short, felted needles which do not melt without decomposition. The substance is readily soluble in hot water and rather difficultly soluble in cold water; the solutions are stable to acids and when employed in conjunction with hard water do not yield insoluble calcium soaps.

Heptadecylamine is prepared from stearic acid with the aid of the Curtius' reaction (see Hollemann, Lehrbuch der organischen Chemie 1930, page 292), through the corresponding azide. The product thus obtained is a wax-like and colorless substance insoluble in water but easily soluble in organic solvents, such as ether, benzene, benzine and alcohol. The heptadecylamine melts at 49 C. (see Berichte der deutschen chemischen Gesellschaft, vol. 21, page 2489.)

We claim:

1. The new compounds of the probable general formula:

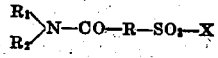

wherein R stands for an alkylene-, aralkylene- or arylene-radical which may be substituted, by a substituent selected from the group consisting of halogen-, hydroxy-, carboxylic-, nitro- and alkyl groups, X means hydrogen, ammonium ($NH_4$) or a metallic equivalent, $R_1$ stands for an aliphatic radical which may be substituted by a substituent selected from the group consisting of hydroxy-, amino-, and halogen groups and which contains at least 8 carbon atoms, $R_2$ means hydrogen or a substituent of the group consisting of an alkyl, aralkyl or aryl or cycloalkyl radical, or an aliphatic radical containing at least 8 carbon atoms being colorless or weakly colored substances, soluble in water or alkalies and being suitable as auxiliary products in the textile industry.

2. The compounds of the probable formula:

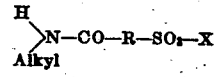

wherein R stands for an alkylene, aralkylene or arylene which may be substituted by a substituent selected from the group consisting of halogen-, hydroxy-, carboxylic-, nitro- and alkyl groups, X means hydrogen, ammonium or a metallic equivalent, and alkyl means an aliphatic radical containing at least 8 carbon atoms, being colorless or weakly colored substances, soluble in water or alkalies and being suitable as auxiliary products in the textile industry.

3. The sodium salt of heptadecylsulfacetamide having the probable formula:

being a colorless water-soluble crystalline substance, stable to acids and to hard water and being particularly suitable as softening, purifying, frothing, wetting and dispersing agent.

WINFRID HENTRICH.
HELMUT KEPPLER.